March 25, 1958 — A. BRUEDER — 2,828,138
HYDRAULIC SUSPENSION SYSTEM FOR VEHICLE WITH
LEVEL CORRECTOR AND BALANCING OF
FRONT AND REAR AXLE REACTIONS
Filed May 31, 1955 — 2 Sheets-Sheet 1

INVENTOR
ANTOINE BRUEDER
BY
ATTORNEY

March 25, 1958 A. BRUEDER 2,828,138
HYDRAULIC SUSPENSION SYSTEM FOR VEHICLE WITH
LEVEL CORRECTOR AND BALANCING OF
FRONT AND REAR AXLE REACTIONS
Filed May 31, 1955 2 Sheets-Sheet 2

INVENTOR
ANTOINE BRUEDER
BY
ATTORNEY

United States Patent Office 2,828,138
Patented Mar. 25, 1958

2,828,138

HYDRAULIC SUSPENSION SYSTEM FOR VEHICLE WITH LEVEL CORRECTOR AND BALANCING OF FRONT AND REAR AXLE REACTIONS

Antoine Brueder, Paris, France, assignor to Société Anonyme Andre Citroen, Paris, France Application May 31, 1955, Serial No. 512,073

Claims priority, application France February 23, 1955

4 Claims. (Cl. 280—124)

The essential object of this invention is to provide in a hydraulic suspension system for vehicle a device adapted to maintain the vehicle frame at a constant level above the road surface irrespective of the load supported by the suspension system, and wherein the reactions of the front and rear axle are always equal to each other.

This invention is also concerned with a suspension system wherein one of the trains of wheels is provided with a device effecting both the level correction and the balancing of the suspension system.

It is another object of this invention to provide a device wherein the equality between the reactions of the front and rear axles is attended at the same time by the unvarying height of the vehicle frame above the ground, this specific feature being obtained by using a device of the type described and illustrated in the U. S. patent application Ser. No. 422,635 filed by the same applicant on April 12, 1954, now Patent No. 2,757,376, dated July 31, 1956.

These various objects are obtained according to this invention by providing on the one hand for each train of wheels a level correction operatively connected to a hydro-pneumatic suspension system, and on the other hand an action exerted on the assembly of one train of wheels according to the average height represented by the position of the middle of the suspension member of the train concerned, the resilient condition of the suspension and the aforesaid level-correcting action depending from each other.

The attached drawings forming part of this specification illustrate diagrammatically by way of example one form of embodiment of an inter-action suspension system having the constant-height characteristic, the arrangement comprising axle-supporting swinging arms and torsion bars.

Figure 1:
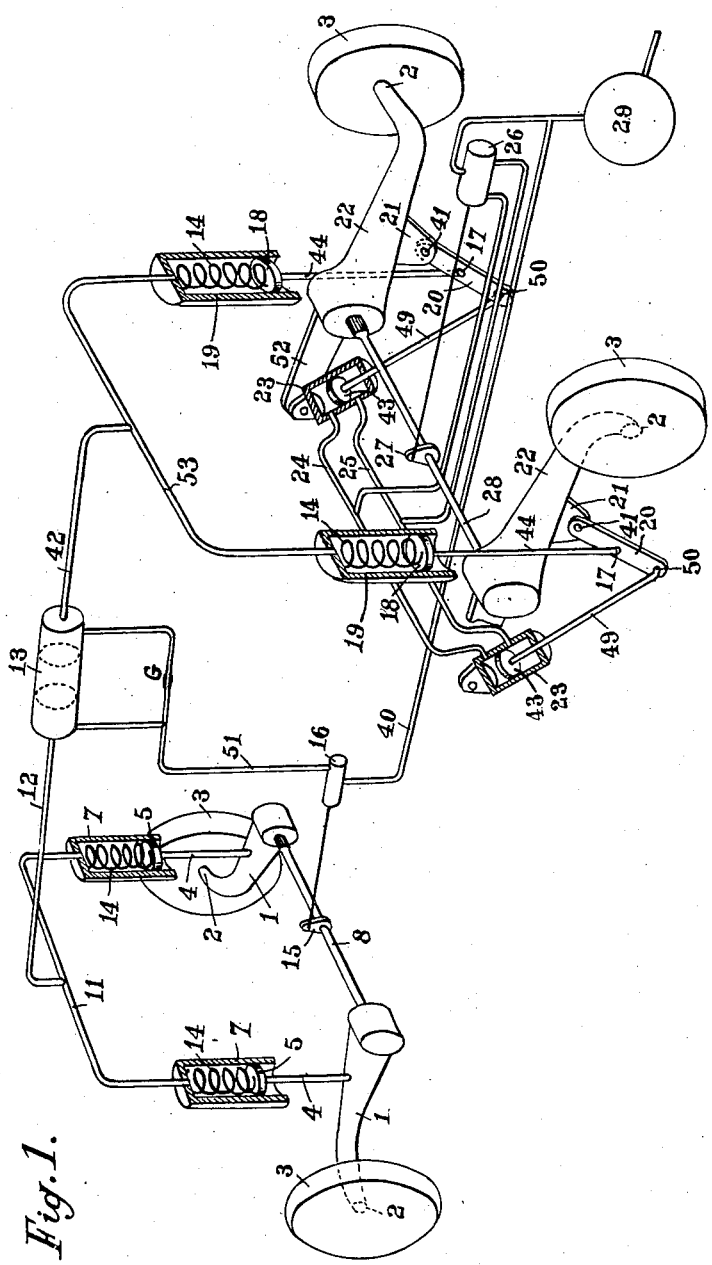
Figure 1 is a diagrammatic view showing the principle of the invention.

I.—Front axle (Fig. 1)

Each swinging arm 1 carrying the stub axle 2 of a wheel 3 has connected thereto the rod 4 of a piston 5 slidably mounted in a cylinder 7 secured on the frame of the vehicle. An anti-roll torsion bar 8 is mounted between the pair of front swinging arms to limit the transverse movements thereof; the pair of front suspension cylinders 7 positioned on the left and right sides of the suspension system are interconnected through a pipe line 11 and a common pipe line 12 leads from this pipe 11 to the suspension chamber 13.

An anti-hunting spring 14 is located between the piston 5 and the bottom of the cylinder 7 of each wheel suspension. The spring load represents a fraction of the reaction produced on the piston, this fraction being as small as possible.

A height corrector 16 already known per se is controlled by the angular displacement of the anti-roll torsion bar 8 by means of an arm 15 and a suitable transmission rod. This corrector is adapted to add fluid to or remove it from the chamber 13 and is connected to this chamber through a pipe line 51 so as to keep the vehicle to a constant height, irrespective of the load.

The hydraulic assembly is fed with fluid under pressure from the accumulator 29, through the pipe line 40 and corrector 16, but the portion acting upon the rear wheel assembly must be separate from the portion acting upon the front wheel assembly, so that the latter alone will receive the volume of corrector fluid; therefore, the minor leaks likely to gradually drain off the fluid from the portion acting upon the rear wheel assembly must be compensated. This is the function devolved to the communication illustrated between the two ends of the cylinder 13, and the jet G is interposed in the pipe line 38 to prevent any undue amount of fluid from being transferred during the reactions of the suspension system.

II.—Rear axle

As in the case of the front axle the suspension cylinders 19 are interconnected through a pipe line 53 having a common connection 42 with the suspension chamber 13.

Each wheel support 22 must be able to vary so as to obtain in the front and rear suspension cylinders the same reaction irrespective of the load supported by the axles.

The rod 44 of piston 18 of each suspension system is pivoted at 17 on the central portion of a link 20 pivoted in turn at one end 50 on the rod 49 of the piston 43 of a double-acting corrector cylinder 23 and at the other end 41 on a lug 21 rigid with the wheel support 22. Cylinder 23 is pivotally connected to a support 52 carried by wheel support 22.

The correction cylinders 23 of the two wheel suspensions are interconnected through pipe pipes 24, 25 leading from each side of the pistons 43, these pipe lines being supplied with pressure fluid from a distributor 26 controlled by the angular position of the centre arm 27 rigid with the anti-roll torsion bar 28 connecting the rear-axle swinging arms 22 to each other.

An anti-hunting spring 14 is located between the piston 18 and the bottom of the cylinder 19 of each wheel suspension. The spring load represents for example 10% of the reaction produced on the piston.

Figure 2:
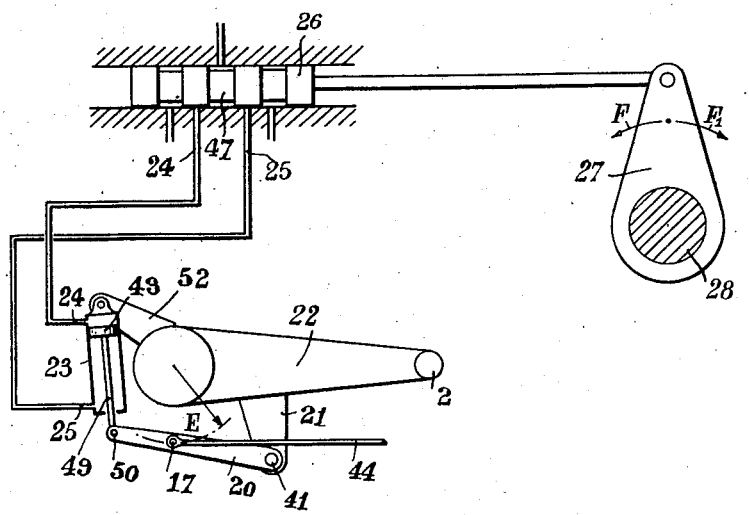
Figure 2 is a detail view showing the correction-controlling distributor according to Fig. 1.
Figure 3:
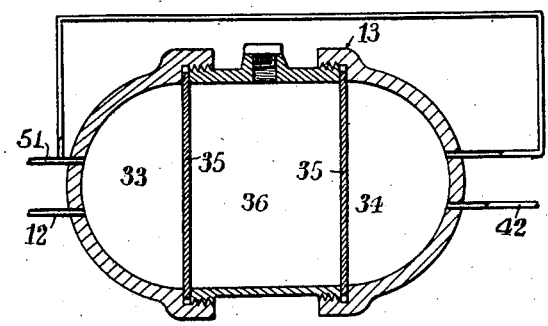
Figure 3 is a detail view showing the hydraulic suspension chamber.

III.—Distributor (Fig. 2)

In the unloaded condition of the vehicle the lever 27 of the torsion bar is so positioned that the slide-valve of distributor 26 closes the two ports 24, 25 leading to the corrector cylinders 23. The hydraulic pressure inlet is thus balanced in the central groove 47 (Fig. 2).

When the suspension member 28, for example an anti-roll torsion bar, rotates in the direction of the arrow F, the slide valve 26 is moved to the left and fluid under pressure is fed to the pipe line 24 and flows into the cylinder 23, thereby causing the piston 43 to move downwards and act through a rod 49 on the link 20, and increasing the distance measured from the fulcrum of the wheel support 22 on the frame to the pivoting connection 17 of the rod 44 of the suspension cylinder 19. The reverse occurs when the intermediate point 27 of the suspension member 28 rotates in the direction of the arrow $F_1$, the slide valve 26 supplying the other pipe line 25.

IV.—Hydro-pneumatic suspension chamber

The chamber 13 comprises two bell-shaped compartments 33, 34 subjected to the fluid pressure from the wheel suspension cylinders 7, and 19 through pipe lines 12 and 42. These bell-shaped compartments are separated from each other by a pair of diaphragms 35 so as to form therebetween another fluid-tight compartment 36 containing nitrogen at superatmospheric pressure.

The pressure variations produced in the front-wheel suspension cylinders are transmitted to the rear-axle cylinders through the nitrogen in the central compartment 36 of the hydro-pneumatic suspension chamber 13.

Both end compartments 33 and 34 are also supplied with fluid under pressure from the height corrector 16 through the oil pipe line 51 to assure a constant height of the vehicle and compensate any fluid leakage if necessary.

A vehicle equipped with this suspension system will retain automatically its balance since any inclination of the vehicle forwardly or rearwardly under the influence of any load will produce an angular displacement of the corresponding anti-roll torsion bar about its axis and the distributor controlled by this bar will alter the length of the lever arm of the rear wheel suspension cylinders to provide two novel equalized reactions.

The rotation of the anti-roll torsion bars will also act on the height correctors to maintain the height of the vehicle to a constant value irrespective of the loads carried by the vehicle.

What I claim is:

1. A hydraulic suspension system for a vehicle having two pairs of wheels with a wheel support for each wheel of each pair comprising, in combination, a first rod secured to a wheel support of one pair of wheels, a second rod secured to the other wheel support of said one pair of wheels, a pair of first hydraulic suspension cylinders adapted to be secured to the vehicle chassis, a first piston movable in one of said cylinders and connected to one of said rods, a second piston movable in the other of said cylinders and connected to the other of said rods, conduit means interconnecting said suspension cylinders, a hydraulic suspension chamber connected to said conduit means, a first suspension member interconnecting the wheel supports of said one pair of wheels, a first distributor controlling flow of fluid in said suspension chamber, said distributor having an operating element connected to the mid-point of said suspension member, a first link pivoted at one end to a wheel support of the other pair of wheels, a second link pivoted at one end to the other wheel support of the other pair of wheels, a pair of second hydraulic suspension cylinders adapted to be secured to the vehicle chassis, conduit means connecting said pair of second suspension cylinders to said suspension chamber, a first piston movable in one of said second suspension cylinders and connected to the mid-point of one of said links, a second piston movable in the other of said second suspension cylinders and connected to the mid-point of the other of said links, a pair of double-acting corrector cylinders adapted to be secured to the vehicle chassis, a piston in each corrector cylinder, a rod connecting one of said pistons to one of said links, a rod connecting the other of said pistons to the other of said links, conduit means interconnecting said corrector cylinders, a second suspension member interconnecting the wheel supports of said other pair of wheels, a second distributor controlling said corrector cylinders, said second distributor having an operating element connected to the mid-point of said second suspension member, and means interconnecting said second distributor with said first distributor.

2. In a hydraulic suspension system according to claim 1, anti-hunting springs disposed between the piston and bottom of each of said wheel suspension cylinders.

3. In a hydraulic suspension system according to claim 1, the provision of a hydro-pneumatic suspension chamber comprising an enclosure divided into three aligned compartments by a pair of resilient diaphragms, the central compartment being filled with an inert gas under pressure, each end compartment being connected on the one hand to the front and rear wheel suspension cylinders and on the other hand to the height corrector of one of the pairs of wheels.

4. In a hydraulic suspension according to claim 1, the arrangement in the distributor controlling the double-acting corrector cylinders of the rear pair of wheels of a slide valve associated with means for closing the ports controlling the supply of pressure fluid to said cylinders when the vehicle is under minimum load conditions and supplying pressure fluid to one or the other side of the pistons of each of said corrector cylinders according to the displacements of the supension member.

References Cited in the file of this patent

UNITED STATES PATENTS 2,687,311     Nallinger _____ Aug. 24, 1954